United States Patent
Jin et al.

(10) Patent No.: US 10,785,775 B2
(45) Date of Patent: Sep. 22, 2020

(54) NETWORK ASSISTED INTERFERENCE CANCELLATION AND SUPPRESSION METHOD, APPARATUS, SYSTEM AND RELATED DEVICE

(71) Applicant: China Mobile Communications Corporation, Beijing (CN)

(72) Inventors: Jing Jin, Beijing (CN); Hui Tong, Beijing (CN); Fei Wang, Beijing (CN); Yuchao Liu, Beijing (CN); Zhenping Hu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 0 days.

(21) Appl. No.: 15/309,699

(22) PCT Filed: May 7, 2015

(86) PCT No.: PCT/CN2015/078458
§ 371 (c)(1),
(2) Date: Nov. 8, 2016

(87) PCT Pub. No.: WO2015/169236
PCT Pub. Date: Nov. 12, 2015

(65) Prior Publication Data
US 2017/0265179 A1    Sep. 14, 2017

(30) Foreign Application Priority Data
May 8, 2014    (CN) .......................... 2014 1 0193238

(51) Int. Cl.
*H04M 1/74*    (2006.01)
*H04W 72/04*    (2009.01)
(Continued)

(52) U.S. Cl.
CPC ......... *H04W 72/048* (2013.01); *H04J 11/005* (2013.01); *H04L 5/005* (2013.01);
(Continued)

(58) Field of Classification Search
CPC .................................. H04M 1/74; H04M 3/18
See application file for complete search history.

(56) References Cited

U.S. PATENT DOCUMENTS

| 9,801,192 B2 * | 10/2017 | Kim .................... | H04W 72/082 |
| 2012/0099621 A1 * | 4/2012 | Karlsson ............. | H04W 52/365 |
| | | | 375/148 |

(Continued)

FOREIGN PATENT DOCUMENTS

| CN | 101312575 A | 11/2008 |
| CN | 104995863 A | 10/2015 |

(Continued)

OTHER PUBLICATIONS

Supplementary European Search Report for European Application No. 15789686, dated Mar. 14, 2017, 8 pages.
(Continued)

*Primary Examiner* — Charles N Appiah
*Assistant Examiner* — Xiang Zhang
(74) *Attorney, Agent, or Firm* — Mintz Levin Cohn Ferris Glovsky and Popeo, P.C.; Steven M. Jensen; Derek E. Constantine

(57) ABSTRACT

The disclosure discloses a Network Assisted Interference Cancellation and Suppression (NAICS) method, apparatus, system and related device, for NAICS based on existing hardware configuration of a terminal. A first NAICS method includes the following steps. NAICS capability information reported by a User Equipment (UE) is received. NAICS assisted signalling is issued to the UE according to the NAICS capability information and/or interference informa-
(Continued)

tion of a neighbouring base station. A second NAICS method includes the following steps. Transmission Modes (TM) are divided into N TM subsets, each TM subset including at least one TM, N being a natural number. A neighbouring base station is notified of a TM subset scheduled for an interfering UE, wherein the interfering UE includes a UE located at the edge of a coverage area of the neighbouring base station, and the notified TM subset does not include a high-complexity TM.

17 Claims, 3 Drawing Sheets

(51) Int. Cl.
| | |
|---|---|
| H04W 24/02 | (2009.01) |
| H04J 11/00 | (2006.01) |
| H04L 5/00 | (2006.01) |
| H04W 72/08 | (2009.01) |
| H04L 5/14 | (2006.01) |

(52) U.S. Cl.
CPC ......... H04L 5/0053 (2013.01); H04L 5/0073 (2013.01); H04L 5/0091 (2013.01); H04W 24/02 (2013.01); H04W 72/0413 (2013.01); H04W 72/082 (2013.01); H04L 5/0023 (2013.01); H04L 5/0048 (2013.01); H04L 5/14 (2013.01)

(56) References Cited

U.S. PATENT DOCUMENTS

| | | | |
|---|---|---|---|
| 2013/0188753 A1* | 7/2013 | Tarlazzi | H04B 7/024 375/299 |
| 2014/0269246 A1* | 9/2014 | Yoo | H04L 5/0062 370/201 |
| 2015/0172035 A1 | 6/2015 | Xu et al. | |
| 2015/0201421 A1* | 7/2015 | Park | H04J 11/0056 455/452.1 |
| 2015/0222304 A1 | 8/2015 | Xu et al. | |
| 2015/0312893 A1* | 10/2015 | Prasad | H04B 7/0626 370/328 |
| 2015/0326290 A1* | 11/2015 | Harrison | H04B 7/0456 375/260 |
| 2017/0048749 A1* | 2/2017 | Kim | H04B 17/345 |

FOREIGN PATENT DOCUMENTS

| | | |
|---|---|---|
| CN | 105814824 A | 7/2016 |
| WO | 2015/088688 A1 | 6/2015 |
| WO | 2015/116383 A1 | 8/2015 |

OTHER PUBLICATIONS

"Discussion on network assistance signalling for NAICS receivers", 3GPP TSG RAN WG1 Meeting #76, Agenda Item 7.2.9.2, Prague, Czech Republic, Feb. 10-14, 2014, 6 pages.
"Performance Impact of Network Assistance Signalling for NAICS", 3GPP TSG RAN1 #76, Agenda Item 7.2.9.2, Prague, Czech Republic, Feb. 10-14, 2014, 8 pages.
International Search Report in international application No. PCT/CN2015/078458, dated Jul. 28, 2015.
English Translation of the Written Opinion of the International Search Authority in international application No. PCT/CN2015/078458, dated Jul. 28, 2015.
R1-140476: Network Assistance Signalling Feb. 14, 2014.
R1-140400: Discussion on Network Coordination for NAICS Feb. 14, 2014.
Technical Specification Group Radio Access Network;Evolved Universal Terrestrial Radio Access (E-UTRA);Medium Access Control (MAC) protocol specification; 3GPP TS 36.321 V12.0.0 (Dec. 2013).

* cited by examiner

NETWORK ASSISTED INTERFERENCE CANCELLATION AND SUPPRESSION METHOD, APPARATUS, SYSTEM AND RELATED DEVICE

CROSS-REFERENCE TO RELATED APPLICATIONS

This application is a 371 national phase of International Application No. PCT/CN/2015/078458 filed on May 7, 2015, which claims priority to Chinese Patent Application No. 201410193238.0 filed with the China Patent Office on May 8, 2014. The applications are incorporated herein by reference.

TECHNICAL FIELD

The disclosure relates to the technical field of wireless communications, and in particular to a Network Assisted Interference Cancellation and Suppression (NAICS) method, apparatus, system and related device.

BACKGROUND

NAICS means that a terminal, provided with an advanced receiver, effectively cancels interference by using interference information informed at a network side in conjunction with self blind detection, so as to improve the receiving performance.

FIG. 1 is a schematic diagram of inter-cell interference, and FIG. 2 is a schematic diagram of NAICS. The assisted information from the network side required by a terminal to effectively cancel interference includes cell-specific assisted information and user-specific assisted information, where the cell-specific assisted information may include a system bandwidth, a synchronizing indicator, a cell ID (an identifier of a neighbouring cell), Common Reference Signal (CRS) ports, PA parameters and PB parameters; and the user-specific assisted information may include a Channel Status Information Reference Signal (CSI-RS), a Transmission Mode (TM), a Rank Indication (RI), a Precoding Matrix Indicator (PMI), PA parameters, a Modulation and Coding Scheme (MCS), DeModulation Reference Signal (DMRS) ports, a DMRS Virtual Cell ID (VCID), a resource allocation type, a resource allocation granularity and the like.

Currently, the $3^{rd}$ Generation Partnership Project (3GPP) is discussing how the terminal may acquire these pieces of assisted information, i.e., which of them may be acquired through notification using high-layer signalling and which of them may be acquired through blind detection by the terminal per se. The cell-specific assisted information changes slowly, and can be acquired at a smaller overhead through notification using the high-layer signalling. Therefore, it may be considered that, related information is exchanged between the base stations, and then a user equipment (UE) is notified of the current assisted information by a serving cell of the UE using the high-layer signalling.

In contrast, UE-specific assisted information changes dynamically due to the scheduling flexibility of an interfering base station. The notification using the high-layer signalling will result in a longer interaction delay between the base stations and a larger overhead. Therefore, it is usually considered that the UE-specific assisted information is acquired through terminal blind detection. However, some pieces of assisted information such as a PMI and a DMRS VOID have more options to be blindly detected, so the terminal blind detection may have a higher complexity.

On the other hand, as for a TM in the UE-specific related assisted information, the 3GPP R12 version supports ten TMs, wherein there are six CRS-based TMs (TM 1 to TM 6), and there are four Dedicated Reference Signal (DRS)/DMRS-based TMs (TM 7 to TM 10), where for the DRS/DMRS-based TMs, it is not required to blindly detect the PMI, so the blind detection complexity is relatively low; and for the CRS-based TMs, it is required to blindly detect the PMI, so the blind detection complexity is high, as shown in Table 1. Table 1 is comparison of blind detection counts of the CRS-based TMs.

TABLE 1

| Transmission scheme {layer} | | Number of candidates |
| --- | --- | --- |
| Single antenna port: TM 1 | Port 0 | 1-CW: 1 |
| Transmit diversity: TM 2 | 2-layer for 2-Tx SFBC | 1-CW: 1 |
| | 4-layer for 4-Tx SFBC/FSTD | 1-CW: 1 |
| CDD: TM 3 | 2-layer for 2-Tx CDD | 1-CW: 0; 2-CW{2}: 1 |
| | {2,3,4}-layer for 4-Tx CDD | 1-CW{2}: 1; 2-CW{2,3,4}: 3 |
| Codebook-based precoding: TM 4/6 | {1,2}-layer for 2-Tx precoding | 1-CW {1}: 4; 2-CW{2}: 3 |
| | {1,2,3,4}-layer for 4-Tx precoding | 1-CW{1,2}: 32; 2-CW {2,3,4}: 48 |

As seen from Table 1, for TM 4, the total blind detection count of two of CRS ports is 7, and the total blind detection count of four of the CRS ports is 80. Meanwhile, due to the scheduling flexibility of the interfering base station, an interfering user allocated on each Physical Resource Block (PRB) varies dynamically and thus a TM of the interfering user changes dynamically. It may be not suitable to acquire the UE-specific assisted information by notification using the high-layer signalling, in view of the problems of time delay and overhead. However, if it is intended that the terminal acquires the UE-specific assisted information by the blind detection, the terminal is required to be configured with hardware capable of supporting blind detection for all TMs, which will increase the cost of hardware configuration of the terminal. On the other hand, the TM 4, particularly high-complexity TMs such as TMs having four CRS ports in the TM 4, scheduled by the base station is only a small part of all the TMs. Therefore, for the terminal, support of blind detection for all TMs will cause a waste of its capabilities.

Therefore, how to perform NAICS based on the existing hardware configuration of the terminal, particularly NAICS for a low-complexity TM, becomes one of the technical problems to be urgently solved.

SUMMARY

The embodiments of the disclosure provide an NAICS method, apparatus, system and related device, so as to perform NAICS based on the existing hardware configuration of a terminal.

An embodiment of the disclosure provides a first NAICS method implemented at a network side, which may include the following steps:

receiving NAICS capability information reported by a UE; and issuing NAICS assisted signalling to the UE according to the NAICS capability information and/or interference information of a neighbouring base station.

An embodiment of the disclosure provides a first NAICS apparatus implemented at a network side, which may include:

a receiving unit, configured to receive NAICS capability information reported by a UE; and a sending unit, configured to issue NAICS assisted signalling to the UE according to the NAICS capability information and/or interference information of a neighbouring base station.

An embodiment of the disclosure provides a first base station device, which may include the first NAICS apparatus.

An embodiment of the disclosure provides an NAICS method implemented at a terminal side, which may include the following steps:

reporting NAICS capability information to a network side; and receiving NAICS assisted signalling issued from the network side according to the NAICS capability information and/or interference information of a neighbouring base station.

An embodiment of the disclosure provides an NAICS apparatus implemented at a terminal side, which may include:

a reporting unit, configured to report NAICS capability information to a network side; and a receiving unit, configured to receive NAICS assisted signalling issued from the network side according to the NAICS capability information and/or interference information of a neighbouring base station.

An embodiment of the disclosure provides a terminal device, which may include the NAICS apparatus implemented at the terminal side.

An embodiment of the disclosure provides a second NAICS method implemented at a network side, which may include the following steps:

dividing TMs into N TM subsets, each TM subset including at least one TM, N being a natural number; and notifying a neighbouring base station of a TM subset scheduled for an interfering UE, wherein the interfering UE includes a UE located at an edge of a coverage area of the neighbouring base station.

An embodiment of the disclosure provides a second NAICS apparatus implemented at a network side, which may include:

a dividing unit, configured to divide TMs into N TM subsets, each TM subset including at least one TM, and N being a natural number; and a notifying unit, configured to notify a neighbouring base station of a TM subset scheduled for an interfering UE, wherein the interfering UE includes a UE located at an edge of a coverage area of the neighbouring base station.

An embodiment of the disclosure provides a second base station device, which may include the second NAICS apparatus.

In the first NAICS method provided by the embodiment of the disclosure, each UE reports its own NAICS capability information to a network side, such that the network side can issue NAICS assisted signalling to the UE according to NAICS blind detection capability information reported by the UE. Since there is no specific requirement on hardware configuration of the terminal in the above process, interference cancellation can be implemented based on the existing hardware configuration of the terminal, and the blind detection complexity of the terminal will not be increased.

In the second NAICS method provided by the embodiment of the disclosure, a network side divides schedulable TMs into a plurality of TM subsets and notify a neighbouring base station of a TM subset scheduled for an interfering UE, such that the TMs of the TM subset are designated for the interfering UE. Thus, NAICS can be implemented based on the existing hardware configuration of the UE without any improvement on the UE.

Other features and advantages of the disclosure will be elaborated in the subsequent specification, are partially obvious from the specification, or are understood by implementing the disclosure. The purposes and other advantages of the disclosure may be achieved and obtained by means of structures specified in the specification, the claims and the drawings.

BRIEF DESCRIPTION OF THE DRAWINGS

The drawings illustrated herein are intended to provide further understanding of the disclosure, and form a part of the disclosure. The exemplary embodiments and illustrations of the disclosure are intended to explain the disclosure, and do not form improper limits to the disclosure. In the drawings.

DETAILED DESCRIPTION

In order to achieve NAICS based on the existing hardware configuration of a terminal without increasing blind detection complexity of the terminal, the embodiments of the disclosure provide an NAICS method and a corresponding apparatus and device from a terminal side and a network side respectively.

Preferred embodiments of the disclosure are illustrated below in conjunction with the drawings of the specification. It will be appreciated that the preferred embodiments described herein are only intended to illustrate and explain the disclosure, and do not limit the disclosure. Moreover, the embodiments of the disclosure and the features in the embodiments can be combined under the condition of no conflicts.

In the embodiments of the disclosure, in order to achieve the object of performing NAICS based on the existing hardware configuration of a terminal without increasing the blind detection complexity of the terminal and reducing requirements for the hardware configuration of the terminal, terminal NAICS capabilities are divided according to the complexity of blind detection for the TM by the terminal. Thus, the scheduling/precoding performance of the network side is not affected, and standardized/industrial development of a low-complexity TM can be promoted.

In practice, the TMs other than TM 4 have smaller number of PMIs to be detected blindly by the terminal, and in this embodiment, the terminal NAICS capabilities may be preferably divided into the following classes depending on whether the terminal supports the blind detection for the TM 4:

1) terminal NAICS capability information includes supporting blind detection for the TM 4; and 2) terminal NAICS capability information does not include supporting the blind detection for the TM 4.

In practice, the terminal NAICS capabilities may be divided depending on the supporting capabilities for blind detection of the terminal for two or four CRS ports:

1) terminal NAICS capability information includes at least supporting blind detection of two CRS ports; and 2) terminal NAICS capability information further includes supporting blind detection of four CRS ports.

Figure 1:
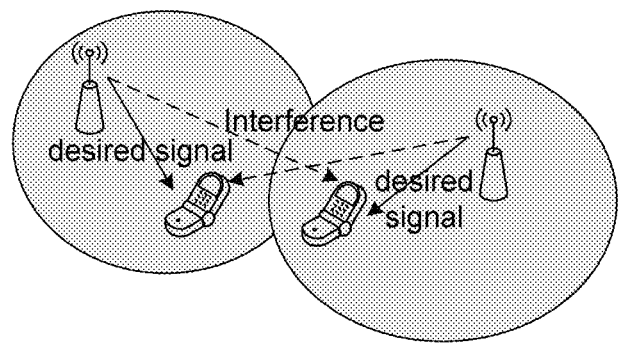
FIG. 1 is a schematic diagram of inter-cell interference in the prior art.
Figure 2:
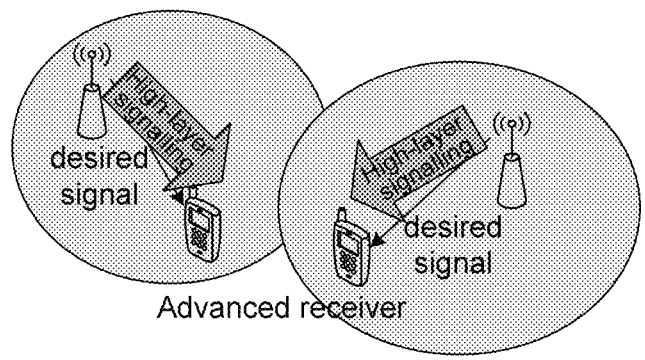
FIG. 2 is a schematic diagram of NAICS in the prior art.
Figure 3:
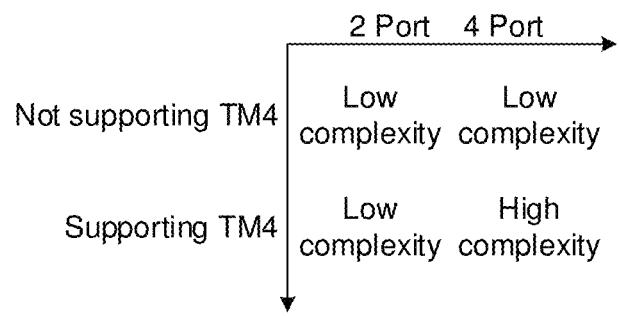
FIG. 3 is a schematic diagram of blind detection complexities corresponding to different terminal NAICS capabilities in an embodiment of the disclosure.

In practice, the four NAICS capabilities may be randomly combined. FIG. 3 shows a schematic diagram of blind detection complexity of a terminal. In practice, if the terminal supports blind detection for TMs with two CRS ports but does not support blind detection for the TM 4, or the terminal supports blind detection for TMs with two CRS ports and supports blind detection for the TM 4, or the terminal supports blind detection for TMs with four CRS ports but does not support blind detection for the TM 4, the blind detection complexity of terminal NAICS is lower; if the terminal supports blind detection for TMs with four CRS ports and does not support blind detection for the TM 4, the blind detection complexity of terminal NAICS is higher.

Figure 4:
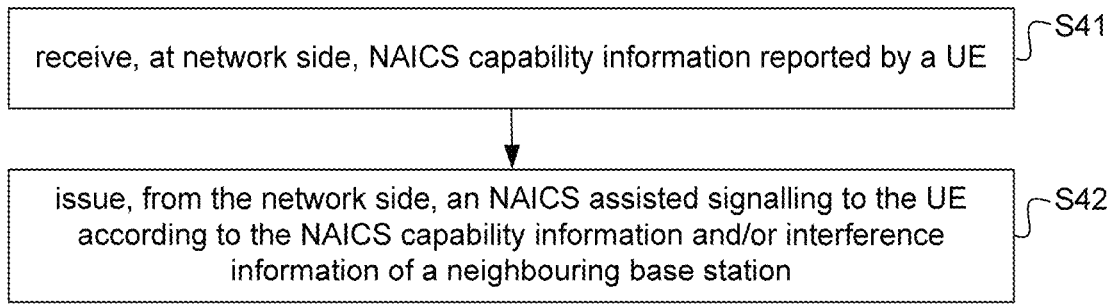
FIG. 4 is a schematic diagram flowchart of a first NAICS method in an embodiment of the disclosure.

Based on the divided terminal NAICS capabilities, FIG. 4 shows an implementation flowchart of a first NAICS method implemented at a network side according to an embodiment of the disclosure. The method includes the following steps:

S41: A network side receives NAICS capability information reported by a UE.

In practice, a terminal may report the NAICS capability information using Radio Resource Control (RRC) signalling. In practice, new RRC signalling may be defined to report the NAICS capability information, or a reserved field in existing RRC signalling may be used to report the NAICS capability information. The disclosure is not limited thereto.

For example, 1-bit information may be used to indicate whether the terminal supports an NAICS capability, wherein the NAICS capability defaults to support blind detection for TMs with two CRS ports or does not support blind detection for TM 4.

Alternatively, as for the combination of four terminal NAICS capabilities shown in FIG. 3, 2-bit information may be used to report the terminal NAICS capability information. 2 bits may be combined in four modes ("00", "01", "10" and "11"), each combination corresponding to one piece of terminal capability information. For example, "00" represents that the terminal supports blind detection for a TM with two CRS ports but does not support blind detection for the TM 4 with two CRS ports, "01" represents that the terminal supports blind detection for a TM with four CRS ports but does not support blind detection for the TM 4 with four CRS ports, "10" represents that the terminal supports blind detection for all TMs with two CRS ports (including the TM 4 with two CRS ports), and "11" represents that the terminal supports blind detection for all TMs with four CRS ports (including the TM 4 with four CRS ports).

Alternatively, in practice, the NAICS capability information reported by the terminal carries indication information indicating the number of CRS ports that is supported by the terminal for blind detection and/or indicating whether blind detection of four CRS ports is supported. For example, a possible report format of the NAICS capability information is {1,2}, which represents that the terminal supports blind detection of one CRS port and two CRS ports, or the NAICS capability information may also be expressed as {1,2,4}, which represents that the terminal supports blind detection of one CRS port, two CRS ports and four CRS ports. In practice, a reserved field ("reserved") may also be designed in the terminal NAICS capability information for reserving an indicating bit for the number of the CRS ports possibly supported by the terminal. For example, if the terminal supports blind detection of one CRS port and two CRS ports, a format of the NAICS capability information reported by the terminal may be {1,2,reserved} indicating that the terminal supports blind detection of one CRS port and two CRS ports and reservation capability.

S42: The network side issues NAICS assisted signalling to the UE according to the NAICS capability information and/or interference information of a neighbouring base station.

In practice, in Step S42, the network side may determine whether the UE can cancel interference according to the received NAICS capability information and/or the interference information of the neighbouring base station. If yes, the network side issues the NAICS assisted signalling to the UE. If no, the network side does not issue the NAICS assisted signalling, or the network side may also issue the NAICS assisted signalling to the UE, and the UE may omit the corresponding NAICS assisted signalling.

In practice, the interference information of the neighbouring base station may include, but is not limited to, a TM used by the neighbouring base station.

Preferably, by taking the combination of terminal NAICS capabilities shown in FIG. 3 as an example, the network side may judge whether the terminal can cancel interference in accordance with the manners as follows.

If the NAICS capability information includes supporting blind detection of two CRS ports and the neighbouring base station uses more than two CRS ports to perform data transmission, it is determined that the UE cannot cancel interference; or if the NAICS capability information includes supporting blind detection of two CRS ports and the neighbouring base station uses two CRS ports to perform data transmission, it is determined that the UE can cancel interference.

If the NAICS capability information does not include supporting of blind detection of the TM 4 and the neighbouring base station uses the TM 4 to perform data transmission, it is determined that the UE cannot cancel interference; or if the NAICS capability information does not include supporting blind detection for the TM 4 and the neighbouring base station does not use the TM 4 to perform data transmission, it is determined that the UE can cancel interference.

If the NAICS capability information includes supporting blind detection of four CRS ports, the network side may directly determine that the UE can cancel interference; or, if the NAICS capability information includes supporting blind detection for the TM 4, the network side may also directly determine that the UE can cancel interference.

Taking two types of LTE networks, i.e., the Time Division Duplex-Long Term Evolution (TDD-LTE) network and the Frequency Division Duplex-Long Term Evolution (FDD-LTE) network as examples, since a current TDD network is only configured with TMs with two CRS ports, even if the terminal does not support blind detection of four CRS ports, interference may be cancelled when the terminal is in the TDD-LTE network. On the other hand, as for the FDD-LTE network, if the network side does not support the TM 4 or the TM 4 with four CRS ports, the terminal may cancel interference; if the FDD-LTE network side supports the TM 4 or the TM 4 with four CRS ports, the terminal cannot cancel interference. Since most of existing FDD-LTE networks only support TMs with two CRS ports, the NAICS performance loss is small. If the terminal supports blind detection for TMs such as the TM 4 or the TM 4 with four CRS ports, the terminal may cancel interference regardless of the TDD-LTE network or the FDD-LTE network.

Figure 5:
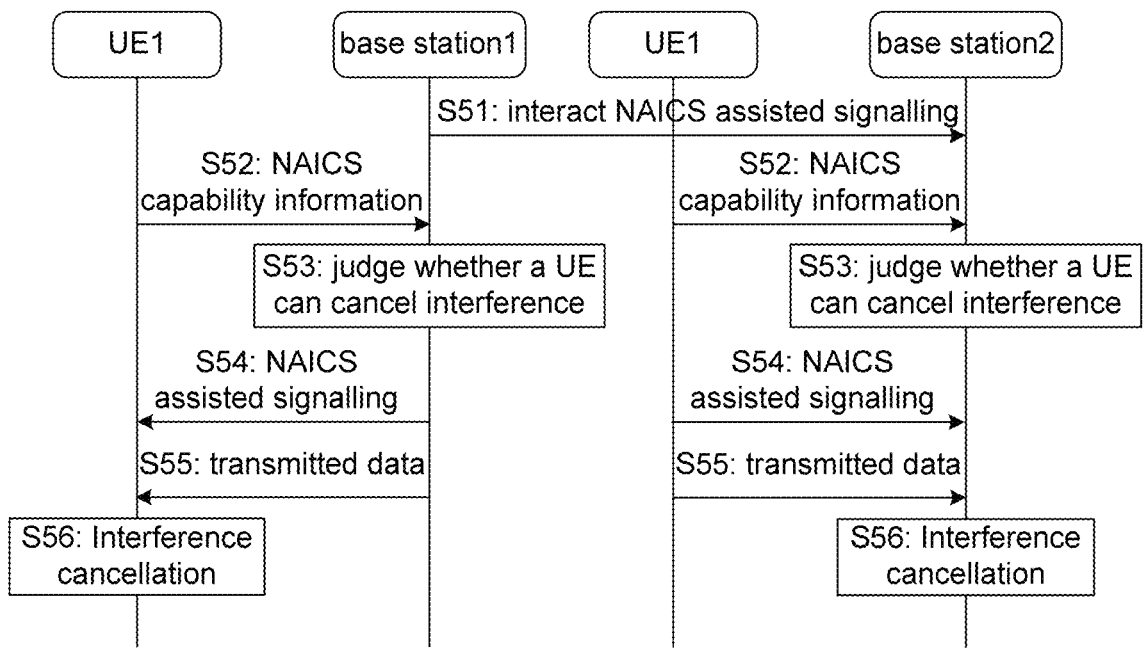
FIG. 5 is a schematic diagram of NAICS signalling interaction in an embodiment of the disclosure.

In order to better understand the embodiments of the disclosure, a specific implementation process of the embodiments of the disclosure will be described in detail below. As shown in FIG. 5, the method may include the steps as follows.

S51: A serving base station and a neighbouring base station interact NAICS assisted signalling needed by a UE to perform the NAICS.

Specifically, the NAICS assisted signalling may include, but is not limited to, the following information: a cell ID of a neighbouring cell, CRS ports, a TM, a PMI and the like.

S52: The UE reports its own NAICS capability information to the serving base station.

That is, UE 1 reports its own NAICS capability information to base station 1, and UE 2 reports its own NAICS capability information to base station 2.

S53: The serving base station judges whether the UE can cancel interference according to the received NAICS capability information.

Specifically, base station 1 judges whether the UE 1 can cancel interference according to the NAICS capability information reported by the UE 1, and base station 2 judges whether the UE 2 can cancel interference according to the NAICS capability information reported by the UE 2. As for base station 1, if UE 1 does not support blind detection for the TM 4, base station 1 has to determine whether a terminal can cancel interference in conjunction with a TM of base station 2 acquired in Step S52; if base station 2 transmits data in the TM 4, base station 1 determines that UE 1 cannot cancel interference; and if base station 2 does not transmit data in the TM 4, base station 1 determines that UE 1 can cancel interference. If UE 1 only supports blind detection of two CRS ports, base station 1 needs to determine whether the terminal can cancel interference in conjunction with the TM of base station 2 acquired in Step S52; if base station 2 transmits data using four CRS ports, it is determined that the terminal cannot cancel interference, and otherwise, it is determined that the terminal cannot cancel interference; and if the terminal supports blind detection for the TM 4 or four CRS ports, base station 1 may directly determine that UE 1 can cancel interference. The process of judging whether UE 2 can cancel interference by base station 2 is similar to the process of judging whether UE 1 can cancel interference by base station 1. Specific implementation may refer to implementation of the process of judging whether UE 1 can cancel interference by base station 1, which will be omitted here.

S54: The serving base station issues NAICS assisted signalling corresponding to the NAICS capability information of the terminal to the UE.

Specifically, base station 1 and UE 1 are taken as an example. If base station 1 determines that UE 1 can cancel interference, the NAICS assisted signalling is issued to UE 1. Otherwise, the NAICS assisted signalling may not be issued. Certainly, in practice, when the base station determines that UE 1 cannot cancel interference, the NAICS assisted signalling may be issued to UE 1. However, since UE 1 cannot cancel interference, the NAICS assisted signalling issued by the base station 1 may be omitted.

S55: The UE receives data transmitted by the serving base station.

S56: The UE performs interference cancellation on the received data according to the received NAICS assisted signalling in conjunction with self blind detection.

In practice, if the UE does not receive the NAICS assisted signalling issued by the serving base station, data will be received in accordance with an existing manner without needing to perform interference cancellation on the received data.

It should be noted that the serving base station and the neighbouring base station are divided with respect to roles of a base station in NAICS. For example, as for UE 1 in FIG. 5, base station 1 is the serving base station, and base station 2 is the neighbouring base station; and as for UE 2, base station 1 is the neighbouring base station, and base station 2 is the serving base station.

In addition, in the embodiment of the disclosure, Step S51 and Step S52 are not necessary to be executed in a certain sequence. Step S52 may be executed before Step S51.

In the NAICS method provided by the embodiment of the disclosure, terminal capabilities are divided according to blind detection complexity of TMs supported by the terminal, the terminal reports own NAICS capability information to the network side, and the network side judges whether the terminal can cancel interference according to the capability information reported by the terminal in conjunction with the interference information of the neighbouring base station. If the terminal can cancel interference, the NAICS assisted signalling is issued to the terminal. Otherwise, the NAICS assisted signalling may not be issued. In the above process, on one hand, interference cancellation can be performed based on the hardware configuration of the terminal, and the terminal does not have to support blind detection with a high-complexity TM, thereby reducing requirements for the hardware configuration of the terminal and reducing the blind detection complexity of the terminal. On the other hand, since the terminal does not support blind detection for the high-complexity TM, the network side may not issue the NAICS assisted signalling, and therefore network transmission resources can be saved.

Figure 6:
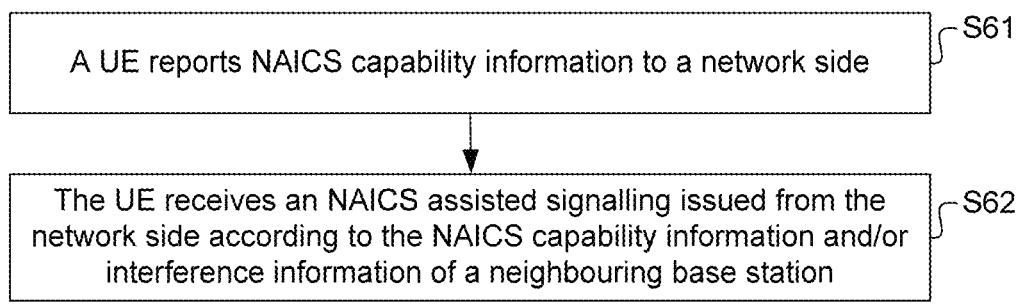
FIG. 6 is an implementation flowchart of an NAICS method implemented by a terminal side in an embodiment of the disclosure.

FIG. 6 shows an implementation flowchart of an NAICS method implemented at a terminal side. The method may include the following steps.

S61: A UE reports NAICS capability information to a network side.

In practice, the NAICS capability information reported to the network side by the UE may carry indication information indicating the number of CRS ports supporting blind detection. The implementation of the UE reporting the NAICS capability information to the network side in Step S41 may be referred to for details, which will be omitted here.

S62: The UE receives NAICS assisted signalling issued from the network side according to the NAICS capability information and/or interference information of a neighbouring base station.

The implementation of Step S62 may refer to the implementation step of issuing the NAICS assisted signalling to the UE by the base station in the above NAICS method implemented by the network side, which will be omitted here.

In practice, for the existing the hardware configuration of a terminal, TMs used by the network side may be limited from the network side. That is, the network side is limited so as not to transmit data using a high-complexity TM. Thus, the terminal does not need to support blind detection of the high-complexity TM, such that the hardware configuration cost of the terminal will not be increased, and the blind detection complexity of the terminal is reduced.

In the embodiment of the disclosure, the usable TMs of the network side may be classified, and TMs are selected according to actual requirements of a TDD-LTE network and an FDD-LTE network.

Figure 7:
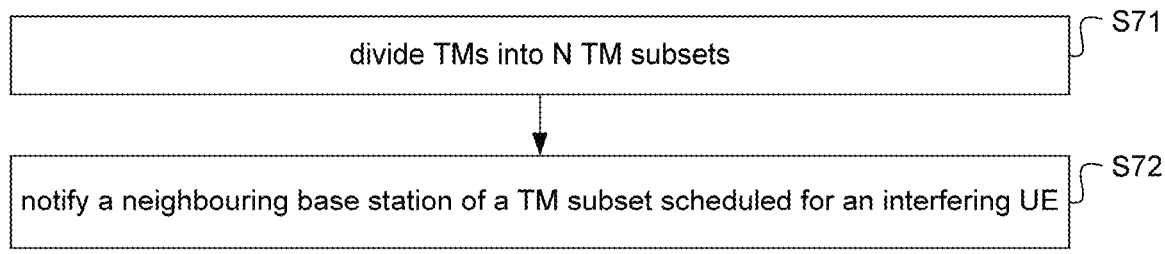
FIG. 7 is an implementation flowchart of a second NAICS method in an embodiment of the disclosure.

FIG. 7 shows an implementation flowchart of a second NAICS method implemented at a network side according to an embodiment of the disclosure. The method may include the following steps.

S71: TMs are divided into N TM subsets.

Where each TM subset includes at least one TM, and N is a natural number. For example, all TMs may be divided into a plurality of TM subsets such as {3,4,9}, {3,4}, {3,9}, {3,9,10} and {3,8}.

S72: A neighbouring base station is notified of a TM subset scheduled for an interfering UE.

In practice, the neighbouring base station may be notified of a usable TM subset of the interfering UE using high-layer signalling. Thus, when the neighbouring base station schedules resources for the interfering user, data may be transmitted using a TM included in a defined TM subset, wherein the interfering UE includes a UE located at the edge of a coverage area of the neighbouring base station. Thus, a terminal can achieve NAICS based on its existing hardware configuration without the need of supporting blind detection for all TMs. In practice, if the terminal does not support blind detection for a high-complexity TM, a network side may select a TM subset which does not include the high-complexity TM from the divided TM subsets.

Preferably, before the TMs are divided into the N TM subsets, the TMs may also be classified in accordance with transmission manners. For example, the TMs may be divided into DRS/DMRS detection-based TMs and CRS detection-based TMs. For example, the TMs may be divided into two classes, i.e., {7,8,9,10} and {2,3,4,5,6}. However, the division is not limited thereto.

Thus, in Step S71, at least one TM may be selected from each class of TMs such that the selected TMs constitute one of the TM subsets.

Based on the same inventive concept, the two NAICS methods and corresponding apparatuses and devices are provided in the embodiments of the disclosure respectively. The principles of solving problem of the apparatuses and devices are similar to the two NAICS methods, so implementation of the apparatuses and devices may refer to implementation of the methods, and those repeated will be omitted here.

Figure 8:
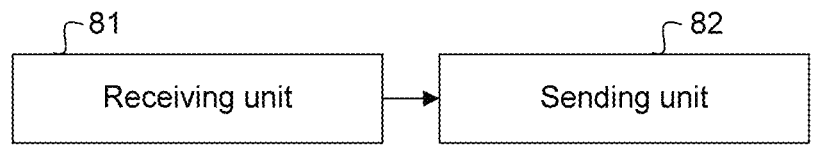
FIG. 8 is a structural diagram of a first NAICS apparatus in an embodiment of the disclosure.

FIG. 8 shows a structural diagram of a first NAICS apparatus implemented at a network side according to an embodiment of the disclosure. The apparatus may include:

a receiving unit 81, which may be configured to receive NAICS capability information reported by a UE; and a sending unit 82, configured to issue NAICS assisted signalling to the UE according to the NAICS capability information and/or interference information of a neighbouring base station.

In practice, the sending unit 82 may include a judgement subunit and a sending subunit, wherein the judgement subunit may be configured to judge whether the UE can cancel interference according to the NAICS capability information and/or the interference information of the neighbouring base station; and the sending subunit may be configured to issue the NAICS assisted signalling to the UE if a judgement result of the judgement subunit is yes.

Figure 9:
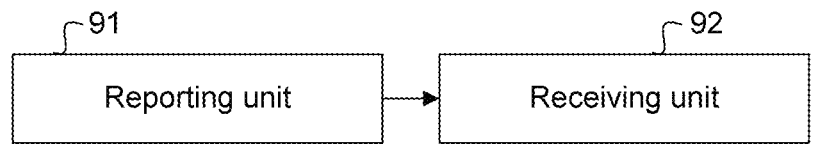
FIG. 9 is a structural diagram of an NAICS apparatus implemented by a terminal side in an embodiment of the disclosure.

FIG. 9 shows a structural diagram of an NAICS apparatus implemented at a terminal side according to an embodiment of the disclosure. The apparatus may include:

a reporting unit 91, configured to report NAICS capability information to a network side; and a receiving unit 92, configured to receive NAICS assisted signalling issued from the network side according to the NAICS capability information and/or interference information of a neighbouring base station.

Figure 10:
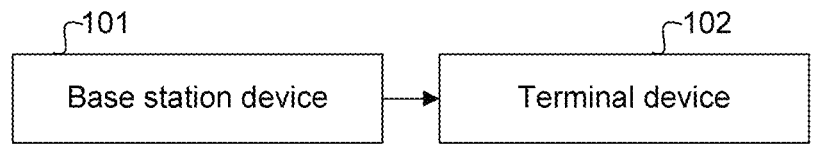
FIG. 10 is a structural diagram of an NAICS system in an embodiment of the disclosure.

FIG. 10 shows a structural diagram of an NAICS system according to an embodiment of the disclosure. The system includes a base station device 101 and a terminal device 102, wherein the base station device 101 may include the NAICS apparatus implemented at a network side, and the terminal device 102 may include the NAICS apparatus implemented at a terminal side.

Figure 11:
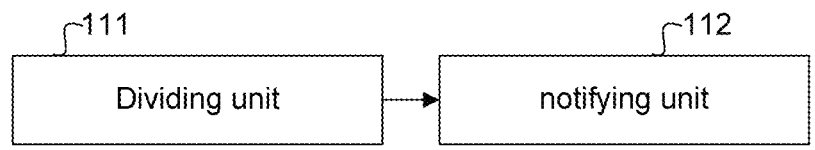
FIG. 11 is a structural diagram of a second NAICS apparatus in an embodiment of the disclosure.

FIG. 11 shows a structural diagram of a second NAICS apparatus implemented at a network side according to an embodiment of the disclosure. The apparatus includes:

a dividing unit 111, configured to divide TMs into N TM subsets, each TM subset including at least one TM, and N being a natural number; and a notifying unit 112, configured to notify a neighbouring base station of a TM subset scheduled for an interfering UE, wherein the interfering UE includes a UE located at an edge of a coverage area of the neighbouring base station.

In practice, the second NAICS apparatus provided by the embodiment of the disclosure may further include a classification unit, configured to classify, before the dividing unit 111 divides the TMs into the N TM subsets, the TMs in accordance with transmission manners; and the dividing unit 111 is specifically configured to select at least one TM from each class of TMs such that the selected TMs constitute one of the TM subsets.

In order to facilitate descriptions, the parts of the description are respectively described corresponding to the functional modules (or units). Certainly, in practice, the functional modules (or units) may be achieved in one or more pieces of software or hardware. For example, the two NAICS apparatuses implemented at a network side may be disposed in a base station, and the NAICS apparatus implemented at a terminal side may be disposed in a terminal device.

Those skilled in the art shall understand that the embodiments of the disclosure may be provided as a method, a system or a computer program product. Thus, forms of hardware embodiments, software embodiments or embodiments integrating software and hardware may be adopted in the disclosure. Moreover, a form of the computer program product implemented on one or more computer available storage media (including but not limited to, a disk memory, a Compact Disc Read-Only Memory (CD-ROM), an optical memory and the like) containing computer available program codes may be adopted in the disclosure.

The disclosure is described with reference to flow charts and/or block diagrams of the method, the device (system) and the computer program product according to the embodiments of the disclosure. It will be appreciated that each flow and/or block in the flow charts and/or the block diagrams and a combination of the flows and/or the blocks in the flow charts and/or the block diagrams may be implemented by computer program instructions. These computer program instructions may be provided for a general computer, a dedicated computer, an embedded processor or processors of other programmable data processing devices to generate a machine, such that an apparatus for implementing functions designated in one or more flows of the flow charts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, such that a manufactured product including an instruction apparatus is generated via the instructions stored in the computer readable memory, and the instruction apparatus implements the functions designated in one or more flows of the flow charts and/or one or more blocks of the block diagrams.

These computer program instructions may also be loaded to the computers or the other programmable data processing devices, such that processing implemented by the computers is generated by executing a series of operation steps on the computers or the other programmable devices, and therefore the instructions executed on the computers or the other programmable devices provide a step of implementing the functions designated in one or more flows of the flow charts and/or one or more blocks of the block diagrams.

Although the preferred embodiments of the disclosures have been described, once those skilled in the art obtains a basic creativity concept, those skilled in the art may change and modify these embodiments additionally. Thus, the appended claims are intended to be interpreted as all changes and modifications including the preferred embodiments and falling within the scope of the disclosure.

Obviously, those skilled in the art may make various modifications and transformations on the disclosure without departing from the spirit and scope of the disclosure. Thus, if these modifications and transformations on the disclosure fall within the scope of the claims and equivalent technologies of the disclosure, the disclosure is also intended to include these modifications and transformations.

What is claimed is:

1. A Network Assisted Interference Cancellation and Suppression (NAICS) method, comprising:
    receiving NAICS capability information indicating a number of Common Reference Signal (CRS) ports that are supported by a User Equipment (UE) for blind detection reported by the UE, wherein the NAICS capability information includes at least supporting blind detection of two CRS ports; and
    issuing NAICS assisted signalling to the UE according to the NAICS capability information and interference information of a neighbouring base station.

2. The method according to claim 1, wherein the NAICS capability information further comprises supporting blind detection of four CRS ports.

3. The method according to claim 1, wherein the NAICS capability information does not comprise supporting blind detection for Transmission Mode (TM) 4.

4. The method according to claim 1, wherein the NAICS capability information comprises supporting blind detection for the TM 4.

5. The method according to claim 1, wherein issuing the NAICS assisted signalling to the UE according to the NAICS capability information and the interference information of the neighbouring base station comprises:
    judging whether the UE can cancel interference according to the NAICS capability information and the interference information of the neighbouring base station; and
    issuing the NAICS assisted signalling to the UE if yes.

6. The method according to claim 5, wherein if the NAICS capability information comprises supporting the blind detection of two CRS ports and the neighbouring base station uses more than two CRS ports to perform data transmission, it is determined that the UE cannot cancel the interference; or
    if the NAICS capability information comprises supporting the blind detection of two CRS ports and the neighbouring base station uses two CRS ports to perform data transmission, it is determined that the UE can cancel interference.

7. The method according to claim 5, wherein if the NAICS capability information does not comprise supporting the blind detection for the TM 4 and the neighbouring base station transmits data in the TM 4, it is determined that the UE cannot cancel interference; or
    if the NAICS capability information does not comprise supporting the blind detection for the TM 4 and the neighbouring base station does not use the TM 4 to perform data transmission, it is determined that the UE can cancel interference.

8. The method according to claim 5, wherein if the NAICS capability information comprises supporting blind detection of four CRS ports, it is determined that the UE can cancel interference.

9. The method according to claim 5, wherein if the NAICS capability information comprises supporting the blind detection for the TM 4, it is determined that the UE can cancel interference.

10. The method according to claim 1, wherein issuing the NAICS assisted signalling to the UE according to the NAICS capability information and the interference information of the neighbouring base station comprises:
    judging whether the UE can cancel interference according to the NAICS capability information and the interference information of the neighbouring base station; and
    when judging the UE cannot cancel interference according to the NAICS capability information and the interference information of the neighbouring base station, not issuing the NAICS assisted signalling to the UE so that data will be received in accordance with an existing manner without needing to perform interference cancellation on the received data.

11. The method according to claim 1, further comprising:
    classifying the Transmission Modes (TMs) in accordance with transmission manners;
    dividing TMs into N TM subsets, each TM subset comprising at least one TM, and N being a natural number; and
    notifying a neighbouring base station of a TM subset scheduled for an interfering UE, wherein the interfering UE comprises a UE located at an edge of a coverage area of the neighbouring base station.

12. The method according to claim 11, wherein the TMs are divided into two classes: CRS detection-based TM and Dedicated Reference Signal (DRS)/DeModulation Reference Signal (DMRS) detection-based TM.

13. A Network Assisted Interference Cancellation and Suppression (NAICS) apparatus, comprising:
    a receiving unit, configured to receive NAICS capability information indicating a number of Common Reference Signal (CRS) ports that are supported by a User Equipment (UE) for blind detection reported by the UE, wherein the NAICS capability information includes at least supporting blind detection of two CRS ports; and a sending unit, configured to issue NAICS assisted signalling to the UE according to the NAICS capability information and interference information of a neighbouring base station.

14. The apparatus according to claim 13, wherein the sending unit comprises:

a judgement subunit, configured to judge whether the UE can cancel interference according to the NAICS capability information and the interference information of the neighbouring base station; and a sending subunit, configured to issue the NAICS assisted signalling to the UE if a judgement result of the judgement subunit is yes.

15. A Network Assisted Interference Cancellation and Suppression (NAICS) method, comprising:

reporting NAICS capability information to a network side, wherein the NAICS capability information indicates a number of Common Reference Signal (CRS) ports that are supported by a User Equipment (UE) for a blind detection and includes at least supporting blind detection of two CRS ports; and receiving NAICS assisted signalling issued from the network side according to the NAICS capability information and interference information of a neighbouring base station.

16. The method according to claim 15, wherein the NAICS capability information further carries indication information indicating whether blind detection for a Transmission Mode (TM) 4 is supported.

17. The method according to claim 16, wherein a report format of the NAICS capability information is {1,2} which indicates blind detection of one CRS port and two CRS ports is supported; or a report format of the NAICS capability information is {1,2,reserved}, which indicates blind detection of one CRS port and two CRS ports and a reservation capability are supported; or a report format of the NAICS capability information is {1,2,4}, which indicates blind detection of one CRS port, two CRS ports and four CRS ports are supported.

* * * * *